Sept. 18, 1956
R. C. BLACK
2,763,378
SERVICE TRAY
Filed June 8, 1953
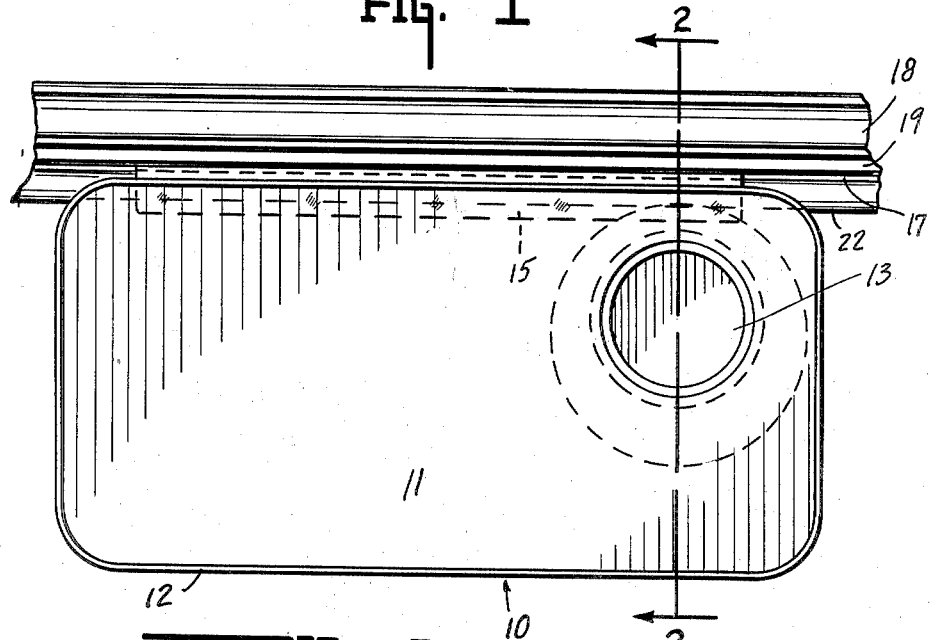
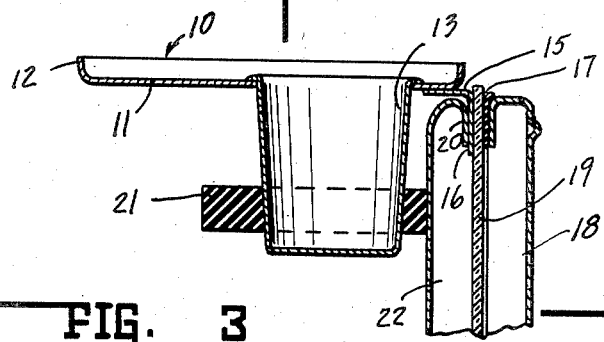
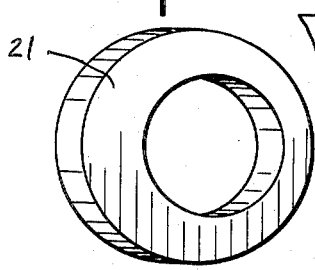 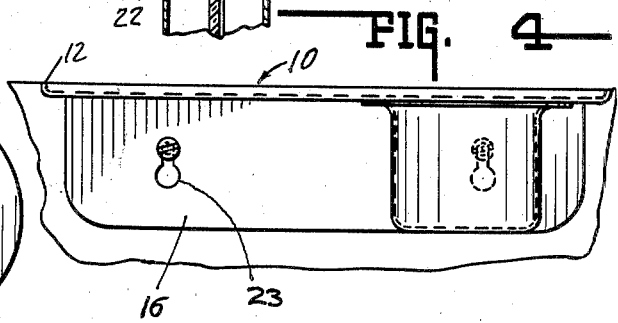
INVENTOR.
RALPH C. BLACK.
BY
Lockwood, Galt, Woodard & Smith.
ATTORNEYS.

United States Patent Office 2,763,378
Patented Sept. 18, 1956

2,763,378
SERVICE TRAY
Ralph C. Black, Indianapolis, Ind.

Application June 8, 1953, Serial No. 360,070

2 Claims. (Cl. 211—88)

This invention relates to a food and drink service tray, and more particularly to one adapted for use in an automobile.

It is the primary object of this invention to provide a service tray which may be hooked in the window recess of an automobile door and which will remain in a level, horizontal use position regardless of the opening or closing of the window.

There has long been a need for a curb service and the like tray which may be supported within an automobile in such manner that it is not only within convenient reach of the patron but is at all times in a level, horizontal position. The problem in achieving these desired characteristics has stemmed from the fact that the interiors of automobiles are not particularly adapted to support such trays. The present invention is, however, so constructed that it readily accomplishes the desired objectives.

It is a further object of the present invention to provide a service tray which is adapted to accomplish the desired ends regardless of the make or model of the automobile with which it is used. This is accomplished through the provision of an eccentric leveling ring that envelops and embraces in friction fit relationship, the walls of a depending drinking glass receiving well.

It is a still further object of the present invention to provide a service tray which will support a drinking glass in such manner as to avoid the spilling of its contents even when the automobile is in motion.

The full nature of the invention will be understood from the accompanying drawings and the following description and claims.

In the drawings:

Fig. 1 is a top plan view of the invention inserted into the glass channel of an automobile door.

Fig. 2 is a sectional view taken on the line 2—2 of Fig. 1 and in the direction of the arrows.

Fig. 3 is a perspective view of the leveling ring.

Fig. 4 is a front elevational view of a modified form of the invention.

In the drawings, the tray is shown at 10, it comprising the substantially flat surface 11 bordered by an upturned flange 12. Preferably located at one end of the tray is the well 13 which is sized to receive any standard sized drinking glasses or cups, and which depends a substantial distance, relatively from the flat surface of the tray. As will be readily observed, the tray can be used not only to support sandwiches, cigarettes or the like, but as well, liquid refreshment.

Secured to the under surface of the tray intermediate its ends is an elongated angle 15. The downturned portion or arm 16 of the angle is sized so that it easily slips into that portion of the window receiving recess 17 of the door 18 that lies between the window 19 and the inner wall 20 defining the recess. As will be observed, particularly by reference to Fig. 2 of the drawing, the well is located adjacent said downturned or depending arm 16.

By making the downturned portion 16 of deformable or bendable material, it would be possible to support the tray temporarily in horizontal position. But such a construction would not be effective if the window was raised or lowered, nor would it serve its intended leveling purposes in all cars. This is true since the width of the door frames varies in different models of cars. To overcome this disadvantage, a leveling ring 21 is provided. This ring is eccentric as shown, and is preferably formed of a rubber or resilient non-scratching substance.

As will be observed in Fig. 1, the ring frictionally engages the outer walls defining the liquid receptacle receiving well. It is to be left in the same vertical position but is fitted loosely enough to enable it to be rotated as desired.

By reason of the eccentricity of the ring and the fact that it can be rotated about the walls of the well, the tray may readily be adjusted to a level horizontal position regardless of the model of the automobile in which it is used, and regardless of the width of the door portion 22.

A modification of the invention is shown in Fig. 4 wherein spaced slots 23 are formed in the depending arm 16. These are preferably but not necessarily of key type and are adapted to receive the heads of screws which may be secured on the sides of card tables, gliders, lawn furniture, beach chairs and the like. In short, the modified form of the invention is adapted for use in environments other than automobiles.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. An automobile tray comprising a substantially flat member having a well portion depending therefrom a substantial distance relative to said member for reception of a liquid container, an angle having one arm connected to said member, the other arm of said angle depending from said member adjacent one marginal edge thereof for insertion within the window receiving recess of an automobile door said well portion being located adjacent the depending arm of the angle, and a rotatable tray leveling ring of eccentric character loosely mounted on said well portion adjacent the lower end thereof and adapted to engage the door of the automobile for leveling said tray by rotation of said ring.

2. An automobile tray comprising a dished member having a well portion depending therefrom a substantial distance relative to said member, means connected to said member including a depending arm for insertion in the window receiving recess of an automobile door said well portion being located adjacent said depending arm, and a rotatable tray leveling ring of eccentric character frictionally engaging and embracing the periphery of said well portion adjacent the lower end thereof and adapted to engage the door of the automobile for leveling said tray by rotation of said ring.

References Cited in the file of this patent

UNITED STATES PATENTS

| | | |
|---|---|---|
| 1,224,127 | Bartlett | May 1, 1917 |
| 1,337,886 | Debakey | Apr. 20, 1920 |
| 1,329,605 | Jeffers | Feb. 3, 1920 |
| 1,593,834 | McNeal et al. | July 27, 1926 |
| 1,714,776 | Hamm | May 28, 1929 |
| 1,820,635 | Strickland | Aug. 25, 1931 |
| 1,901,377 | Roe | Mar. 14, 1933 |
| 2,123,257 | Provost | July 12, 1938 |

FOREIGN PATENTS

| | | |
|---|---|---|
| 518,642 | Great Britain | Mar. 4, 1940 |